United States Patent [19]
Hatoh et al.

[11] Patent Number: 5,354,627
[45] Date of Patent: Oct. 11, 1994

[54] MOLTEN CARBONATE FUEL CELL

[75] Inventors: Kazuhito Hatoh, Daitou; Junji Niikura, Hirakata; Eiichi Yasumoto, Kadoma; Takaharu Gamo, Fujiidera, all of Japan

[73] Assignee: Matsushita Electric Industrial Co., Ltd., Osaka, Japan

[21] Appl. No.: 64,712

[22] Filed: May 19, 1993

[30] Foreign Application Priority Data

Aug. 13, 1992 [JP] Japan ................................. 4-215986

[51] Int. Cl.$^5$ ............................................. H01M 8/14
[52] U.S. Cl. ............................................. 429/40; 429/44; 429/45; 429/46
[58] Field of Search ........................ 429/40, 45, 44, 46

[56] References Cited

U.S. PATENT DOCUMENTS 4,247,604  1/1981  Marianowski et al. ................ 424/40
4,659,379  4/1987  Simph et al. .

Primary Examiner—Prince Willis, Jr.
Assistant Examiner—M. Nuzzolillo
Attorney, Agent, or Firm—Ratner & Prestia

[57] ABSTRACT

A molten carbonate fuel cell includes unit cells and separator plates stacked alternately, with each unit cell having an anode of porous nickel-base alloy, a cathode of porous nickel-oxide doped with lithium, and an electrolyte plate including a eutectic mixture of a carbonate of alkaline metals disposed between the anode and cathode. The separator plate is a heat-resistant metal plate. The anode of porous nickel-base alloy contains 1 to 10 weight % of at least one of molybdenum and tungsten, resulting in less deterioration after a long operation.

5 Claims, 2 Drawing Sheets

MOLTEN CARBONATE FUEL CELL

BACKGROUND OF THE INVENTION

1. Field of the Invention

This invention relates to a molten carbonate fuel cell, and more specifically to the porous anode thereof mainly consisting of a nickel-base alloy.

2. Description of Prior Art

A molten carbonate fuel cell is a DC electric power generating system comprising a unit cell consisting of an anode and cathode with an electrolyte plate therebetween. A plurality of unit cells are stacked with separator or bipolar plates therebetween to form a module to be operated under high pressure and at about 650° C. The electrolyte plate is a mixture of electrolyte and electrolyte holding agent, the electrolyte being a eutectic mixture of carbonates of alkaline metals such as lithium or potassium, and the electrolyte holding agent, also called a matrix, comprising $\gamma$-lithium aluminate or $LiAlO_2$ to hold the eutectic mixture in a stable form.

The anode is a porous fuel electrode formed by sintering nickel or a nickel-base alloy. The cathode is a porous oxidant electrode consisting of nickel oxide doped with lithium. Both electrodes are gas diffusion electrodes. With a larger effective area of the three phase zones where the solid phase of electrode, the liquid phase of electrolyte, and the gas phase of reaction gas intersect, the overvoltage of electrochemical reaction for electric power generation becomes smaller, which results in superior performance of the cell.

For stable electric power-generation, the porosity and the size of the pore initially set up must be maintained for a long operating time.

In an anode operating under high pressure and high temperature, however, the porosity and pore distribution changes gradually due to compression creep of the electrode metal, causing the electrode thickness to decrease and the electrode characteristic to deteriorate. The decrease of the electrode thickness causes the contact resistance in the module to increase and promotes the voltage lowering. Known porous anodes for a molten carbonate fuel cell are made of nickel powder at the beginning, powders of nickel-base alloy such as Ni-Al or Ni-Cr, or a mixture of these alloy powders and ceramics powders, as is disclosed in the specification of U.S. Pat. No. 4,247,604.

Although the Ni-Al or Ni-Cr alloys have superior anti-creeping characteristic than nickel alone, the content of aluminum or chromium must be increased to obtain favorable characteristics. However, the increase of the content of aluminum or chromium causes the decrease of electric conduction of the alloys, thereby lowering cell voltage due to IR drop in the anode.

To suppress the over sintering of an anode in operation under high temperature and high pressure, on the other hand, addition of ceramic powder to these nickel-base alloys has been tried. However, the simple mixing of ceramic powder or the coating of alloy powder with ceramics was not enough to suppress the compression creeping of nickel-base alloy of the bulk metal forming the anode.

SUMMARY OF THE INVENTION

The present invention provides a molten carbonate fuel cell with a porous anode of nickel-base alloy having excellent output characteristics and less deterioration of performance over a long operating time.

To obtain this, a molten carbonate fuel cell according to the present invention comprises unit cells and separator plates stacked alternately. The unit cell consists of an anode of porous nickel-base alloy, a cathode of porous nickel-oxide doped with lithium, and an electrolyte plate including a eutectic mixture of carbonate of alkaline metals held between the anode and cathode. The separator plate is a heat-resistant metal plate. The anode of porous nickel-base alloy contains 1 to 10 weight % of at least one of molybdenum and tungsten.

With such an anode according to the present invention the anti-creep characteristic of the anode under high pressure and high temperature is improved, and a molten carbonate fuel cell with excellent characteristics results.

DETAILED DESCRIPTION OF THE INVENTION

Several embodiments of the present invention are explained in detail below.

Table 1 shows various nickel-base alloy powders applied for the molten carbonate fuel cells according to the present invention containing 1 to 10 weight % of molybdenum and/or tungsten, and, for comparison, conventional Ni-Al and Ni-Cr alloy powders. These nickel-base alloy powders are made by an atomization method in which molten alloy is atomized through a thin nozzle into an inert atmosphere such as argon or nitrogen or into water.

TABLE I

| Alloy No. | content(wt%) | | | | | average particle size (μm) |
| | Ni | M | W | AL | Cr | |
| --- | --- | --- | --- | --- | --- | --- |
| 1 | 98 | 2 | — | — | — | 9.8 |
| 2 | 95 | 5 | — | — | — | 9.7 |
| 3 | 93 | 7 | — | — | — | 11.2 |
| 4 | 90 | 10 | — | — | — | 10.3 |
| 5 | 98 | — | 2 | — | — | 9.2 |
| 6 | 95 | — | 5 | — | — | 9.5 |
| 7 | 93 | — | 7 | — | — | 8.7 |
| 8 | 90 | — | 10 | — | — | 10.6 |
| 9 | 96 | 2 | 2 | — | — | 9.1 |
| 10 | 93 | 5 | 2 | — | — | 8.4 |
| 11 | 93 | 2 | 5 | — | — | 9.7 |
| 12 | 90 | 5 | 5 | — | — | 11.3 |
| 13 | 97 | — | — | 3 | — | 11.8 |
| 14 | 95 | — | — | 5 | — | 7.6 |
| 15 | 93 | — | — | 7 | — | 8.8 |
| 16 | 95 | — | — | — | 5 | 11.1 |
| 17 | 93 | — | — | — | 7 | 10.8 |
| 18 | 90 | — | — | — | 10 | 12.4 |

Example 1

Porous electrodes were prepared by forming the alloy powders No. 1 to No. 18 shown in Table 1, with the addition of a mixed solvent of toluene and ethanol and a binder, such as polyvinylbutylal (PVB), into sheets and sintering them for 1 hour in a hydrogen atmosphere of 1100° C. These porous electrodes were applied with loads of 5 kg/cm² in a mixed atmosphere of hydrogen of 68 volume %, carbon dioxide of 16 volume % and moisture of 16 volume % at 650° C. for creep testing. The creep effect was evaluated by the variation of thickness of the electrodes measured with a micrometer before and after the application of the loads. Table 2 gives the results of the creep test by the variation rate after 1000 h, 2000 h, and 5000 h on alloy Nos. 1 to No. 18.

TABLE 2

| Alloy No. | Thickness Variation Rate (%) | | |
|---|---|---|---|
| | 1000h | 2000h | 5000h |
| 1 | 1.9 | 2.0 | 2.3 |
| 2 | 1.5 | 1.7 | 1.9 |
| 3 | 1.1 | 1.0 | 1.2 |
| 4 | 0.5 | 0.7 | 0.8 |
| 5 | 2.5 | 3.0 | 3.1 |
| 6 | 2.2 | 2.5 | 2.9 |
| 7 | 2.0 | 2.0 | 2.2 |
| 8 | 0.8 | 1.0 | 1.1 |
| 9 | 1.9 | 2.4 | 2.8 |
| 10 | 1.5 | 1.9 | 2.1 |
| 11 | 1.6 | 1.9 | 2.3 |
| 12 | 0.7 | 0.9 | 1.1 |
| 13 | 8.7 | 10.2 | 12.1 |
| 14 | 5.6 | 7.8 | 10.7 |
| 15 | 2.2 | 3.9 | 7.9 |
| 16 | 10.1 | 12.5 | 15.5 |
| 17 | 8.8 | 9.9 | 10.3 |
| 18 | 3.6 | 6.7 | 8.2 |

As is shown in Table 2, the electrodes made by sintering nickel-base alloy powder containing 1 to 10 weight % of molybdenum and/or tungsten according to the present invention have a smaller thickness variation rate and superior creep performance than the conventional electrodes made from Ni-Al or Ni-Cr alloy. cl

Example 2

Figure 1:
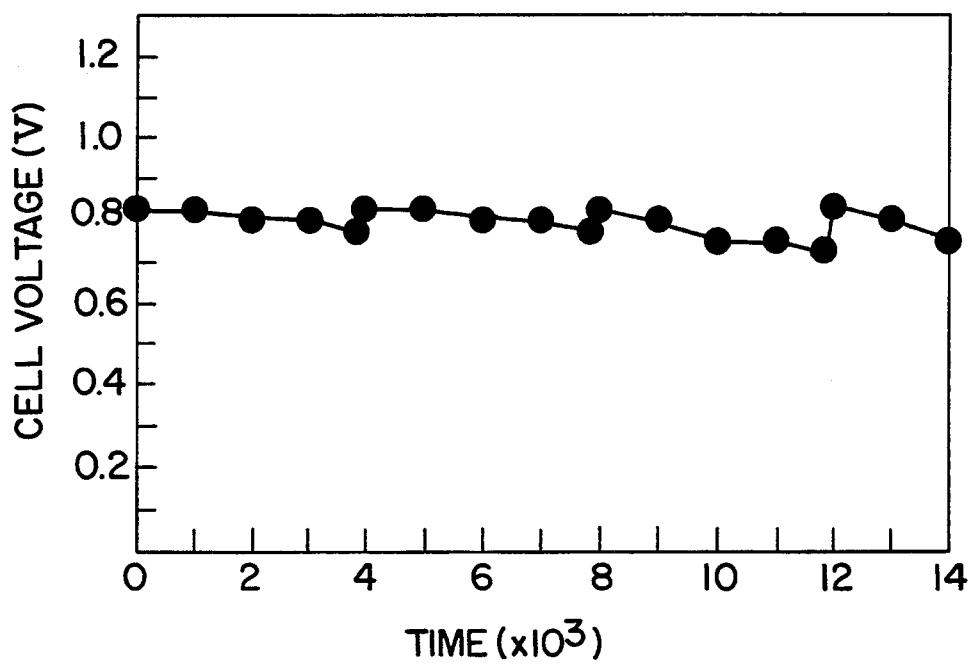
FIG. 1 is a diagram showing the variation of output voltage versus operating time of a molten carbonate fuel cell having porous anodes of nickel-base alloy containing an amount of molybdenum according to an embodiment of the present invention.

A molten carbonate fuel cell was prepared as follows:

The alloy No. 2 of Table 1 consisting of 95 wt % Ni and 5 wt % Mo was applied with 5 wt % of zirconia of average particle size of 1 μm and a solvent and binder, and made to sheet form by the doctor blade method. This sheet or green tape was sintered in a hydrogen atmosphere of 1130° C. to form an anode. The cathode was made of a porous nickel oxide doped with lithium. The electrolyte plate was manufactured by making a matrix plate of lithium aluminate to hold electrolyte of 60 wt % of mixed carbonate (lithium carbonate : potassium carbonate=62:38 mol %). The fuel cell was supplied with fuel gas and an oxidant. The fuel gas was a mixture of hydrogen 80 and carbon dioxide 20 by volume ratio humidified at 55° C. and given to the anode, and the oxidant was a mixture of air 70 and carbon dioxide 30 by volume ratio and sent to the cathode. The cell was operated at 650° C., with current density of 150 MA/cm² and under such condition as 60% fuel utilization. The variation of voltage against time of the unit cell is shown in FIG. 1. It is observed that the cell voltage initially was 0.830 V and was still 0.770 V after 14000 h, which is an extremely small drop.

Example 3

Figure 2:
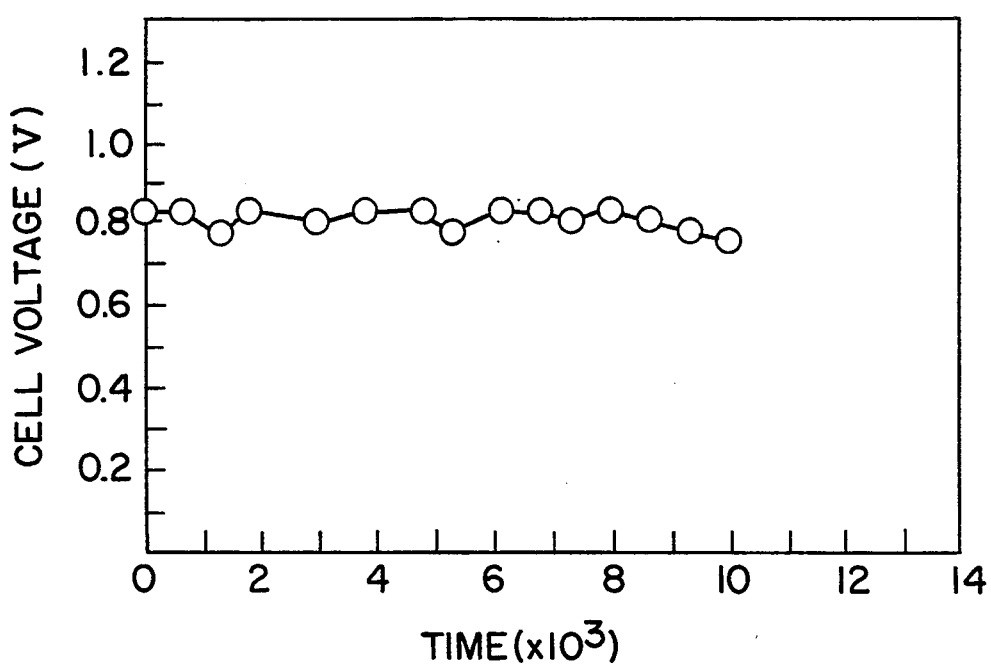
FIG. 2 is a diagram showing the variation of output voltage versus operating time of a molten carbonate fuel cell having porous anodes of nickel-base alloy containing an amount of tungsten according to another embodiment of the present invention.

A powder of alloy No. 6 of Table 1 consisting of 95 wt % Ni and 5 wt % W was mixed with 3 wt % α-alumina powder of 0.2 μm average particle size, and a solvent and a binder, and made to a sheet by the doctor blade method. This sheet or green tape was brought into a cell, and heated up to the temperature for electric power generation baking out the binder and sintering the powder particles to form the anode. Other constituents of the cell, compositions of the fuel gas and oxidant were the same as for the cell of Example 2. The cell was operated under the same conditions as the one of Example 2. The variation of voltage against the operating time is shown in FIG. 2. The voltage initially was 0.825 V and was 0.750 V after 10,000 h, which is a very small drop.

Example 4

Figure 3:
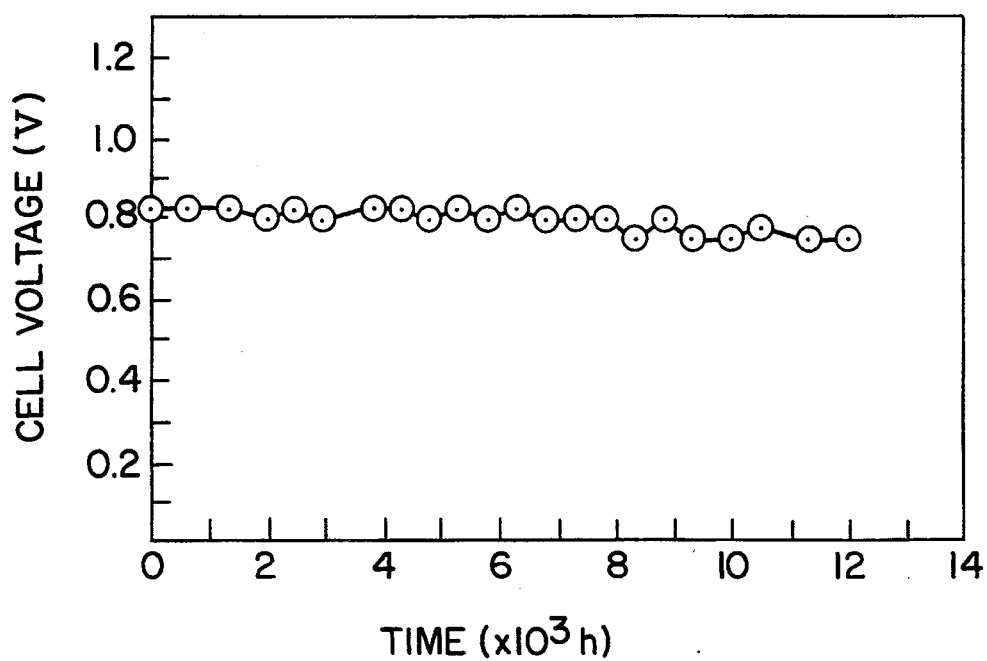
FIG. 3 is a diagram showing the variation of output voltage versus operating time of a molten carbonate fuel cell having porous anodes of nickel-base alloy containing an amount of molybdenum and tungsten according to still another embodiment of the present invention.

Powder of No. 11 alloy of Table 1 consisting of 93 wt % Ni and, 2 wt % Mo and 5 wt % W was mixed with 4 wt % μ-lithium aluminate of 0.7 μm average particle size and, also with a solvent and a binder, made to a sheet by the doctor blade method to form a green tape. Other constituents of the cell, compositions of the fuel gas and oxidant are the same as for the cell of Example 2. The cell was also operated under the same conditions as the one of Example 2. The change of voltage of a typical unit cell against operating time is shown in FIG. 3. A very small voltage drop, initially 0,827 V and 0.780 V after 12000 h, is observed.

Thus, as is shown by Example 2, 3, and 4, cells comprising anodes of nickel-base powder containing 1 to 10wt % of at least one of molybdenum and tungsten and further involving an electrolyte-resisting ceramic powder such as zirconia, α-alumina or γ-lithium aluminate have excellent voltage performance. The term "electrolyte-resisting ceramic powder" represents a powder, in the electrolyte, which does not undergo any chemical change during fuel cell operation.

What is claimed is:

1. A molten carbonate fuel cell including a plurality of unit cells and separator plates stacked alternately, each of said plurality of unit cells comprising:
   (a) an anode of porous nickel-base alloy, containing 1 to 10 weight % of tungsten,
   (b) a cathode of porous nickel-oxide doped with lithium, and
   (c) an electrolyte plate including a eutectic mixture of carbonates of alkaline metals held between said anode and said cathode, and
   wherein each said separator plate is a heat-resistant metal plate.

2. The molten carbonate fuel cell according to claim 1, wherein said anode of porous nickel-base alloy containing 1 to 10 weight % of tungsten is manufactured by sintering an alloy powder with an average diameter less than 15 μm.

3. The molten carbonate fuel cell according to claim 1, wherein said porous anode contains an electrolyte-resisting ceramic powder selected from the group of zirconia, alumina, and lithium aluminate.

4. The molten carbonate fuel cell according to claim 2, wherein said porous anode contains an electrolyte-resisting ceramic powder selected from the group of zirconia, alumina, and lithium aluminate.

5. The molten carbonate fuel cell according to claim 1, wherein said anode further contains up to 9 weight % of molybdenum, the total of said tungsten and molybdenum comprising from 1 to 10 weight % of said nickel-base alloy.

* * * * *